United States Patent
Tamrakar et al.

(10) Patent No.: US 9,426,799 B2
(45) Date of Patent: Aug. 23, 2016

(54) METHOD AND DEVICE FOR DETERMINING EPDCCH RESOURCES

(71) Applicant: CHINA ACADEMY OF TELECOMMUNICATIONS TECHNOLOGY, Beijing (CN)

(72) Inventors: Rakesh Tamrakar, Beijing (CN); Xueming Pan, Beijing (CN); Rui Zhao, Beijing (CN); Ranran Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 183 days.

(21) Appl. No.: 14/383,319

(22) PCT Filed: Mar. 7, 2013

(86) PCT No.: PCT/CN2013/072315
§ 371 (c)(1),
(2) Date: Sep. 5, 2014

(87) PCT Pub. No.: WO2013/139211
PCT Pub. Date: Sep. 26, 2013

(65) Prior Publication Data
US 2015/0016386 A1    Jan. 15, 2015

(30) Foreign Application Priority Data

Mar. 19, 2012 (CN) .......................... 2012 1 0072120
Jun. 19, 2012 (CN) .......................... 2012 1 0202448

(51) Int. Cl.
H04W 72/04    (2009.01)
H04L 5/00     (2006.01)

(52) U.S. Cl.
CPC ............ *H04W 72/042* (2013.01); *H04L 5/0048* (2013.01); *H04L 5/0053* (2013.01); *H04L 5/0094* (2013.01); *H04L 5/0023* (2013.01)

(58) Field of Classification Search
CPC ... H04L 5/0048; H04L 5/0094; H04L 5/0023; H04L 5/0053; H04W 72/042
See application file for complete search history.

(56) References Cited

U.S. PATENT DOCUMENTS 9,084,238 B2 * 7/2015 Gao
9,215,058 B2 * 12/2015 Heo .................... H04L 5/001

(Continued)

FOREIGN PATENT DOCUMENTS

CN    102271402 A    12/2011
CN    102316060 A    1/2012

(Continued)

OTHER PUBLICATIONS

International Search Report for PCT/CN2013/072315, ISA/CN, Beijing, mailed Jun. 13, 2013.

*Primary Examiner* — Ajay Cattungal
(74) *Attorney, Agent, or Firm* — Harness, Dickey & Pierce, P.L.C.

(57) ABSTRACT

The present disclosure provides a method and an apparatus for determining number of ePDCCH resource units. The method includes: determining number of symbols occupied by PDCCH, number of CRS ports, number of DMRS ports and CSI-RS configuration in a subframe; and determining resources available for transmitting an ePDCCH in PDSCH area of the subframe according to the number of symbols occupied by the PDCCH, the number of CRS ports, the number of DMRS ports and the CSI-RS configuration.

14 Claims, 7 Drawing Sheets

(56) References Cited

U.S. PATENT DOCUMENTS

| | | | | |
|---|---|---|---|---|
| 2011/0249633 A1* | 10/2011 | Hong | ............... | H04L 5/0053 370/329 |
| 2013/0064216 A1* | 3/2013 | Gao | ............... | H04L 5/0016 370/330 |
| 2014/0177547 A1* | 6/2014 | Guo | ............... | H04W 72/042 370/329 |
| 2014/0185578 A1* | 7/2014 | Park | ............... | H04J 11/00 370/329 |
| 2014/0206362 A1* | 7/2014 | Xu | ............... | H04W 48/20 455/444 |
| 2014/0301346 A1* | 10/2014 | Seo | ............... | H04L 5/0048 370/329 |

FOREIGN PATENT DOCUMENTS

| | | |
|---|---|---|
| CN | 102316595 A | 1/2012 |
| CN | 102378373 A | 3/2012 |
| WO | WO-2010/140825 A2 | 12/2010 |

\* cited by examiner

US 9,426,799 B2

METHOD AND DEVICE FOR DETERMINING EPDCCH RESOURCES

CROSS-REFERENCE TO RELATED APPLICATIONS

This application is a U.S. National Phase application under 35 U.S.C. §371 of International Application No. PCT/CN2013/072315, filed Mar. 7, 2013, entitled "method and device for determining ePDCCH resources", the entire contents of which are incorporated herein by reference.

FIELD OF THE DISCLOSURE

The present disclosure relates to radio communications techniques, and more particularly, to a method and an apparatus for determining ePDCCH resources.

BACKGROUND OF THE DISCLOSURE

In a long term evolution (LTE) Rel-8/9/10 system, physical downlink control channel (PDCCH) is transmitted in each subframe, as shown in FIG. 1. It occupies first N orthogonal frequency division multiplexing (OFDM) symbols of a subframe, wherein N may be 1, 2, 3 or 4.

In the LTE Rel-8/9/10 system, a control area used for transmitting the PDCCH consists of logical control channel elements (CCEs), wherein one CCE consists of 9 RE groups (REG). One REG consists of 4 resource elements (REs) which are the same in the time domain and are adjacent in the frequency domain. The REs constituting the REG do not include those used for transmitting common reference signals. Detailed definition of the REG is as shown in FIG. 2.

Downlink control information (DCI) is also transmitted taking CCE as a transmission unit. For the DCI of a user equipment (UE, i.e., user terminal), it may be transmitted on M logically continuous CCEs. In the LTE system, the value of M may be 1, 2, 4 or 8, which is referred to as aggregation level. The UE performs a blind detection in the control area, determines whether there is PDCCH transmitted for the UE. The blind detection is to perform decoding attempts with respect to different DCI formats and CCE aggregation levels using radio network temporary identity (RNTI) of the UE. If the decoding is correct, the DCI with respect to the UE is received. The LTE UE needs to perform the blind detection in the control area of each downlink subframe in a discontinuous reception (DRX) status and searches for the PDCCH.

FIGS. 3a, 3b and 3c show configurations of channel state information-reference signal (CSI-RS) in an LTE Rel-10 system, wherein FIG. 3a shows the configuration for 2 ports, FIG. 3b shows the configuration for 4 ports, and FIG. 3c shows multiplexing manner for 8 ports. The number of CSI-RS ports and their resource positions are configured independently for each user. Thus, for different users, different resource positions may be occupied. Each user may further be configured with zero-power CSI-RS resources which are configured following the configuration of 4 CSI-RS ports. No signal is transmitted on the zero-power CSI-RS resources. The zero-power CSI-RS is configured via radio resource control (RRC) signaling. If a 4 port CSI-RS pattern is configured to be zero-power CSI-RS, it indicates that the user regards that no physical downlink shared channel (PDSCH) data is transmitted on these REs.

It can be seen from FIGS. 3a, 3b and 3c that, in one physical resource block (PRB) pair, the size of resources available for transmitting control channel varies with the CSI-RS configuration.

In LTE Rel-11 edition, enhanced PDCCH (ePDCCH) is transmitted in the PDSCH area (i.e., data area). For different CSI-RS configurations, the number of available REs in the PDSCH area may be different, i.e., the number of REs used for transmitting the ePDCCH is different, which has a relatively large impact to demodulation performance of control signaling.

At present, with respect to the LTE Rel-11 edition, there is no transmission solution for the ePDCCH.

SUMMARY OF THE DISCLOSURE

Examples of the present disclosure provide a method and an apparatus for determining ePDCCH resources, so as to determine resources available for transmitting the ePDCCH in a PDSCH area of a subframe when the ePDCCH is transmitted in PDSCH data area.

According to an aspect of the present disclosure, a method for determining ePDCCH resources includes:

determining number of symbols occupied by a physical downlink control channel (PDCCH), number of common reference signal (CRS) ports, number of demodulation reference signal (DMRS) ports and channel state information-reference signal (CSI-RS) configuration in a subframe; and determining resources available for transmitting an ePDCCH in a physical downlink shared channel (PDSCH) area of the subframe according to the number of symbols occupied by the PDCCH, the number of CRS ports, the number of DMRS ports and the CSI-RS configuration.

According to another aspect of the present disclosure, an apparatus for determining ePDCCH resources includes:

a first determining unit, to determine number of symbols occupied by a physical downlink control channel (PDCCH), number of common reference signal (CRS) ports, number of demodulation reference signal (DMRS) ports and a channel state information-reference signal (CSI-RS) configuration in a subframe; and a second determining unit, to determine resources available for transmitting an ePDCCH in a physical downlink shared channel (PDSCH) area of the subframe according to the number of symbols occupied by the PDCCH, the number of CRS ports, the number of DMRS ports and the CSI-RS configuration.

In examples of the present disclosure, through determining the number of symbols occupied by the PDCCH, the number of CRS ports, the number of DMRS ports in the subframe and the CSI-RS configuration, the resources available for transmitting the ePDCCH in the PDSCH area in the subframe may be determined.

DETAILED DESCRIPTION OF THE DISCLOSURE

Hereinafter the present disclosure is described with reference to accompanying drawings and examples.

In examples of the present disclosure, number of symbols occupied by PDCCH, number of CRS ports and number of DMRS ports and CSI-RS configuration in a subframe are determined first. Then, according to the number of symbols occupied by the PDCCH, the number of CRS ports, the number of DMRS ports and the CSI-RS configuration, it is possible to determine the resources for transmitting ePDCCH in the PDSCH area of the subframe.

In one example, for an LTE Rel-11 system, size of a minimum resource unit of ePDCCH (i.e., the number of REs included) is defined first. Then, according to the number of REs available for transmitting the ePDCCH in the PDSCH area in a subframe under each configuration, it is possible to obtain the number of resource units occupied by the ePDCCH in the subframe under the configuration.

Hereinafter, eCCE, eREG and resource block which is obtained through average division of a PRB pair are taken as exemplary minimum resource units of the ePDCCH to describe the present disclosure.

EXAMPLE 1

Example 1 describes a method for determining number of ePDCCH resource units when the eCCE is taken as the minimum resource unit of the ePDCCH.

When the eCCE is taken as the minimum resource unit of the ePDCCH, the size of the eCCE may be defined approximately the same as the CCE in the LTE Rel-8/9/10 system. The size of the eCCE in the subframe may change under different configurations, which is mainly determined by the configuration of the subframe (the number of available REs in the PDSCH area of the subframe may vary under different configurations). In the subframes with the same configuration, the sizes of the eCCEs may be the same or have slight difference, which is mainly determined by a mapping manner from the eCCE to the REs. In particular, one PRB pair includes an integer number of eCCEs. The number is denoted by M. The value of M may be 2, 3 or 4. In the case that the size of the eCCE is defined, the value of M is determined by the number of REs available for the ePDCCH in one PRB pair. For example, it is defined that one eCCE includes approximately 30 REs. Thus, if the number of REs available for the ePDCCH in one PRB pair is less than 90, the PRB pair includes 2 eCCEs. If the number of REs available for the ePDCCH in one PRB pair is between 90 and 120, the PRB pair includes 3 eCCEs. If the number of REs available for the ePDCCH in one PRB pair is between 120 and 150, the PRB pair includes 4 eCCEs, and so on.

Figure 1:
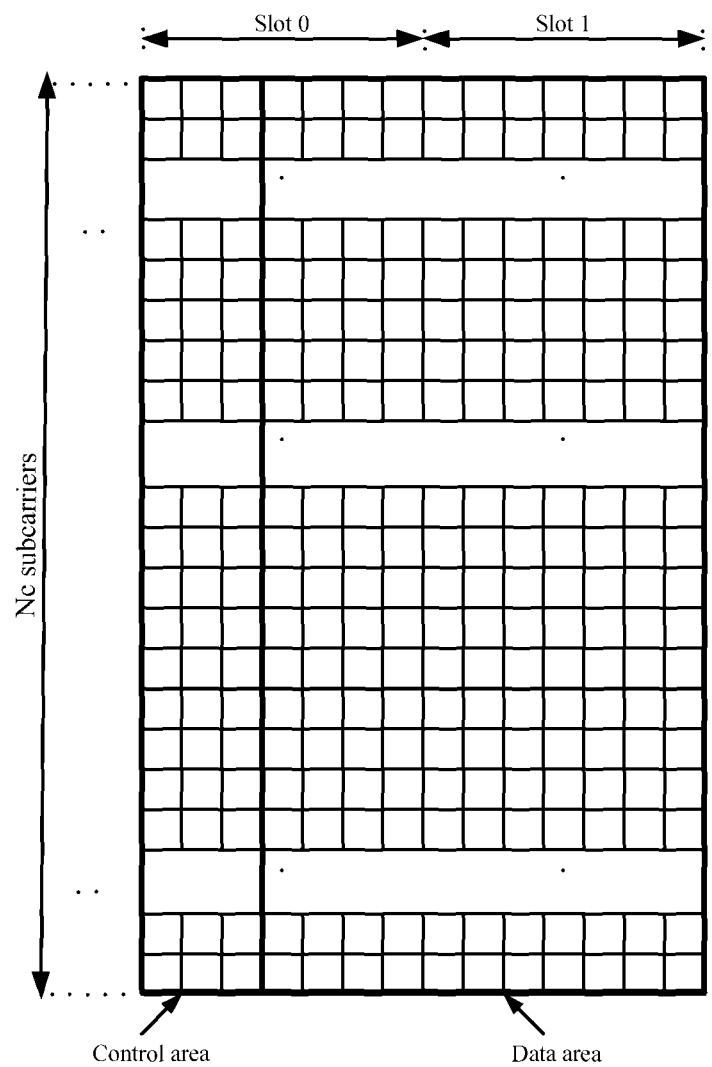
FIG. 1 shows multiplexing of control area and data area in a downlink subframe in a conventional LTE Rel-8/9/10 system.
Figure 2:
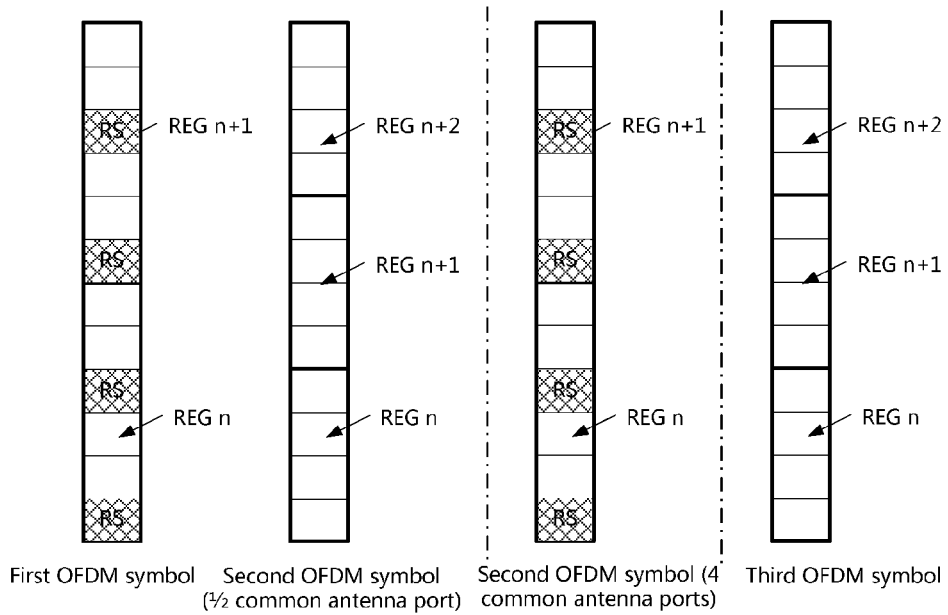
FIG. 2 shows REGs in the conventional LTE Rel-8/9/10 system.
Figure 3A:
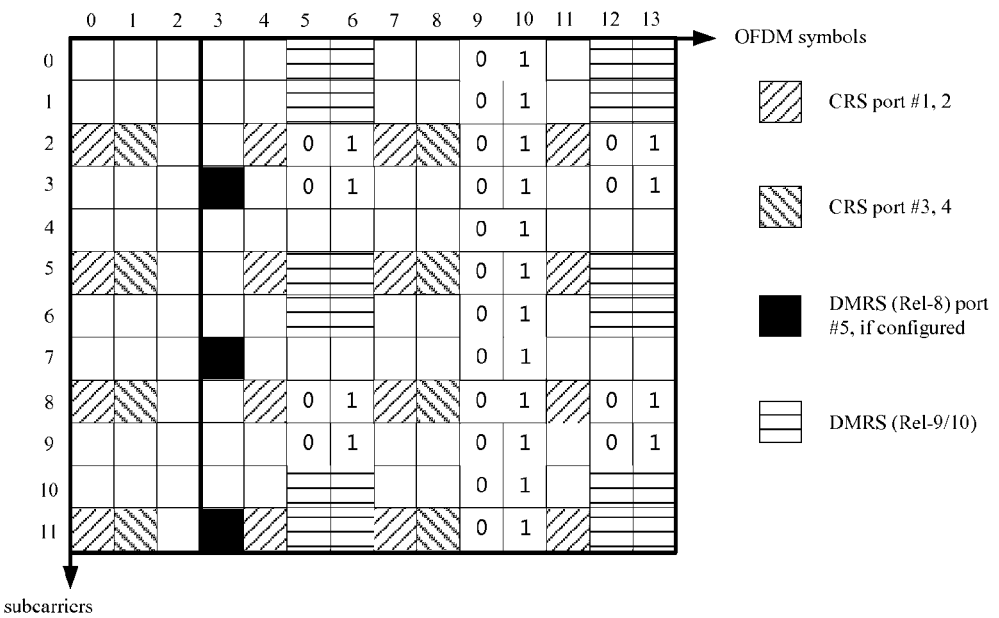
FIGS. 3a, 3b and 3c show CSI-RS configurations in a conventional LTE Rel-10 system.
Figure 3B:
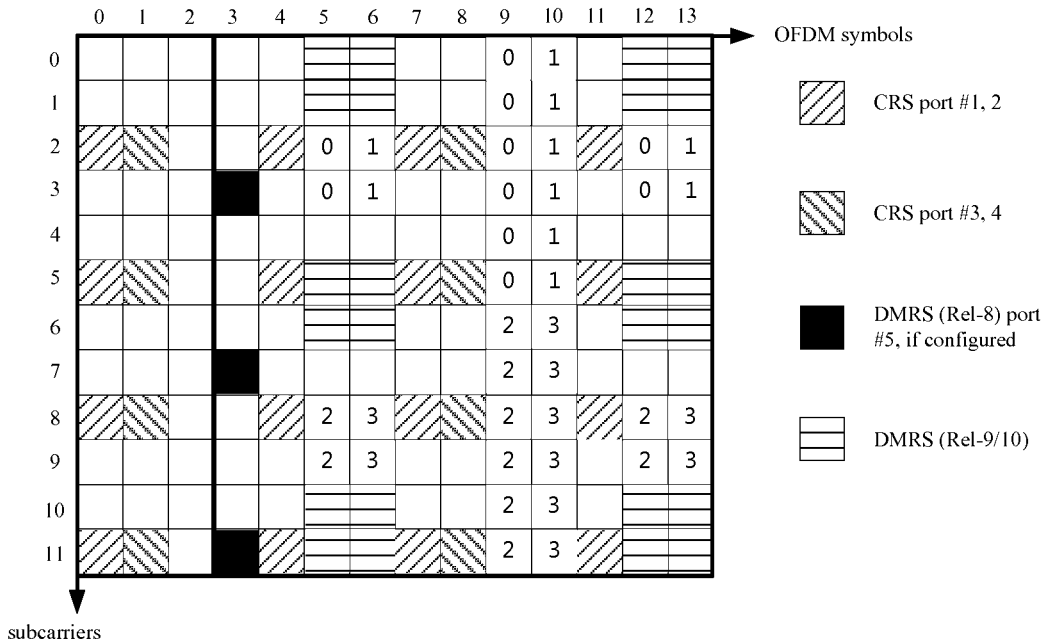
Figure 3C:
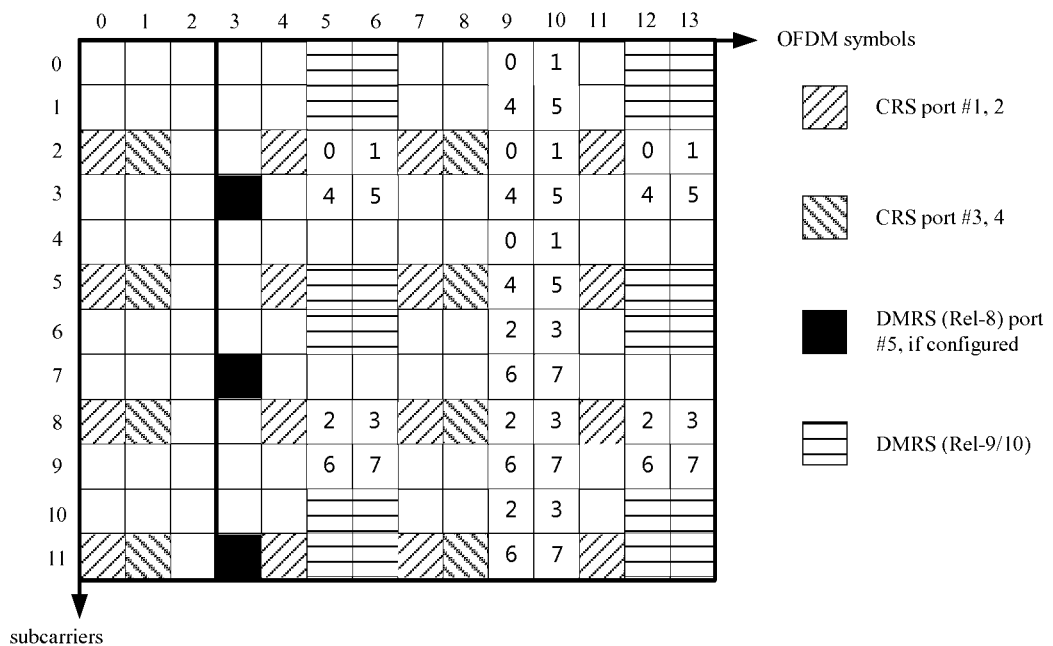
Figure 4A:
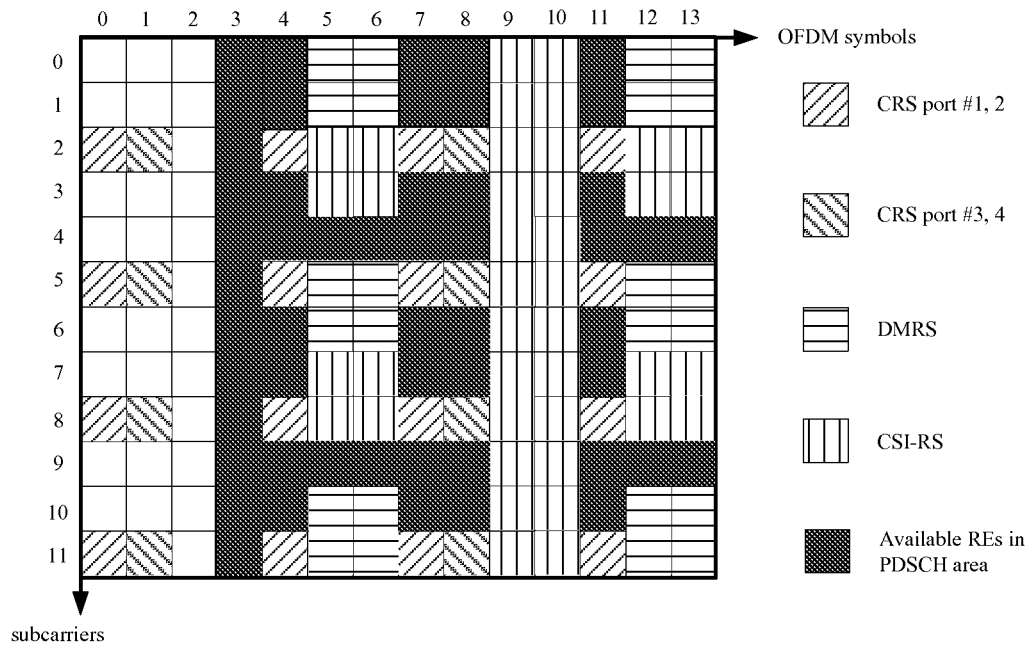
FIGS. 4a, 4b and 4c respectively show number and distribution of eCCEs in a PRB pair in an LTE Rel-11 system according to an example of the present disclosure.
Figure 4B:
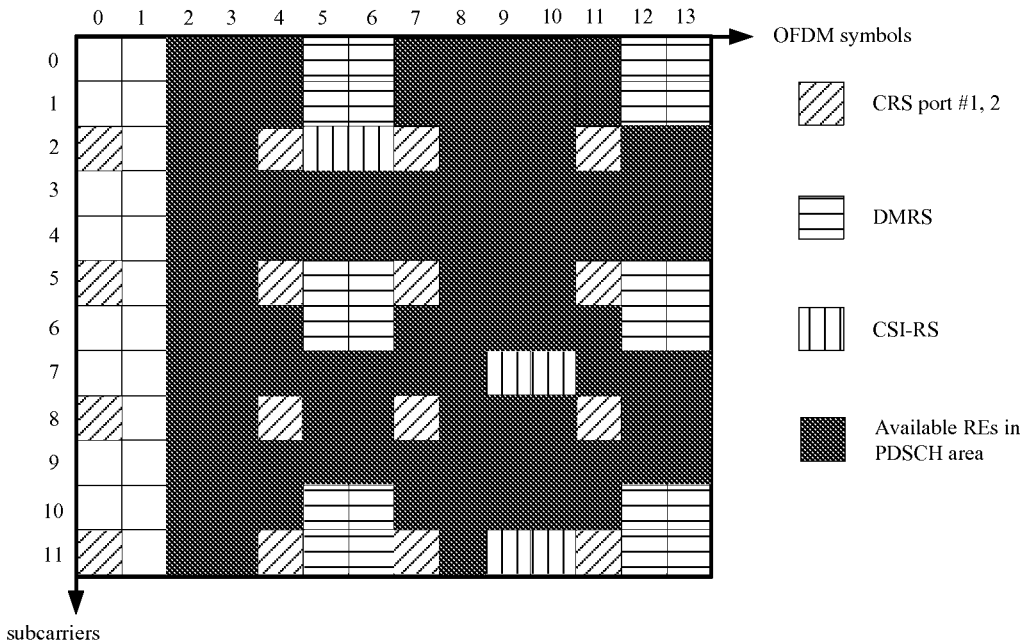
Figure 4C:
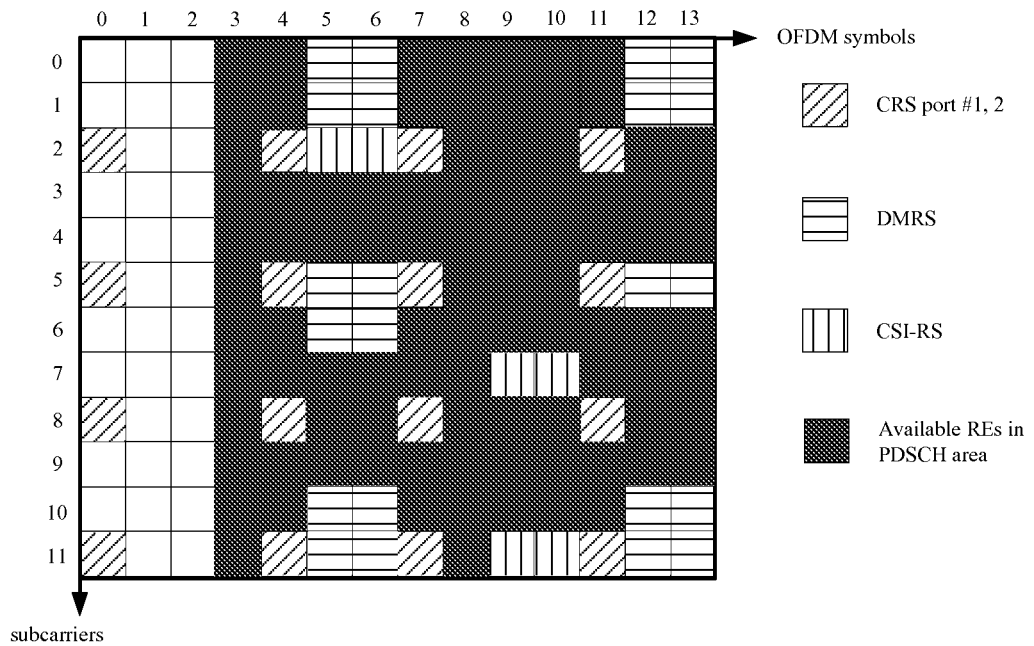

For the PRB pairs under various CSI-RS configurations, FIGS. 4a, 4b and 4c respectively show the size of the eCCE defined by the example of the present disclosure, the number and the distribution of the eCCEs included in the PRB pair under various CSI-RS configurations.

As shown in FIG. 4a, one PRB pair occupies 14 OFDM symbols (symbols 0-13) in the time domain, and occupies 12 subcarriers in the frequency domain (subcarriers 0-11), wherein each small rectangle represents an RE. The first three symbols (symbols 0-2) in the PRB pair are occupied by "conventional PDCCH (i.e., PDCCH in LTE Rel-8/9/10 system)", the data area occupies other symbols (symbols 3-13). In this PRB pair, the rectangles filled by slanted lines represent REs occupied by four CRS (cell reference signal, i.e., common reference signal) ports. The rectangles filled with horizontal lines represent REs occupied by Demodulation reference signal (DMRS). The rectangles filled with vertical lines represent REs occupied by CSI-RS. Thus, 52 RE resources are remained in the data area (e.g., the REs denoted by the black rectangles).If it is defined that one eCCE includes approximately 30 REs, in the case that the number of REs available for the ePDCCH in one PRB pair is less than 90, the PRB pair includes 2 eCCEs. Therefore, the PRB pair as shown in FIG. 4a includes two eCCEs, each of which includes 26 REs. For simplicity, the available REs are divided into two parts, an upper part and a lower part. The 26 REs in the upper part form one eCCE, and the 26 REs in the lower part form another eCCE. The above mapping from the eCCE to the REs is just an example. The mapping may be implemented differently and is not restricted in the present disclosure.

As shown in FIG. 4b, the first two symbols in the PRB pair are occupied by the "conventional PDCCH". The rectangles filled with slanted lines represent the REs occupied by 2 CRS ports. The rectangles filled with horizontal lines represent REs occupied by the DMRS. The rectangles filled with vertical lines represent REs (6 REs in all) occupied by the CSI-RS. Thus, 102 RE resources are remained in the data area. If it is defined that one eCCE includes approximately 30 REs, and in the case that the number of REs available for the ePDCCH in one PRB pair is between 90 and 120, the PRB pair includes 3 eCCEs. Therefore, the PRB pair as shown in FIG. 4b includes 3 eCCEs, each of which includes 34 REs. The mapping from the eCCE to the REs in FIG. 4b is as follows: the available REs in the data area are divided into three parts: an upper part, a middle part and a lower part. The REs in each part form one eCCE. In particular, as shown in FIG. 4b, each of the upper two eCCE includes 35 REs and the lowest eCCE includes 32 REs. The mapping may be implemented via other manners in which the number of REs included in each eCCE may be different from the above example. The number of the REs is related to the adopted mapping manner.

Similarly, as shown in FIG. 4c, the number of REs available for the ePDCCH in the PRB pair is 90. If it is defined that one eCCE includes no more than 30 REs, in the case that the number of available REs for the ePDCCH in one PRB pair is 90~120, the PRB pair shown in FIG. 4c includes 3 eCCEs. According to a mapping similar as FIG. 4b, one eCCE includes approximately 30 REs.

EXAMPLE 2

Example 2 describes a method for determining the number of ePDCCH resource units when eREG is taken as the minimum resource unit of the ePDCCH.

If the eREG is taken as the minimum resource unit of the ePDCCH, it is possible to define the size of the eREG to be the same as the REG in the LTE Rel-8/9/10 system (includes 4 REs) or define the size of the eREG to other values. The number of REs included in the eREG is fixed. When different mapping manners (mapping from eREG to REs) are adopted, the number of eREGs in one PRB pair under the same configuration may change.

As shown in FIG. 4a, the data area includes 52 REs available for the ePDCCH. If it is defined that one eREG includes 4 REs and the mapping manner is 4 REs adjacent in the frequency domain constitute a group, there are 13 eREGs altogether. For the PRB pair as shown in FIG. 4b, the data area includes 102 REs available for the ePDCCH, if the same mapping manner is adopted, there are 23 eREGs altogether (there are some REs cannot be used for ePDCCH transmission). For the PRB pair as shown in FIG. 4b, in case of slanted mapping manner (e.g., subcarrier 4 of symbol 2, subcarrier 5 of symbol 3, subcarrier 6 of symbol 4, and subcarrier 7 of symbol 5 constitute one group), the number of eREGs in one PRB pair may be different from that of the above mapping manner. For the PRB pair as shown in FIG. 4c, if an interleaving mapping manner is adopted, the number of REs cannot be used for ePDCCH transmission may be smaller than that of the frequency-domain continuous mapping manner or the slanted mapping manner.

It can be seen from the above that, for different situations of the number of PDCCH symbols (refers to "conventional PDCCH"), the number of CRS ports, the number of DMRS ports and the CSI-RS configuration, the number of REs available for transmitting the ePDCCH in the PDSCH area may change. The present disclosure may define in standards the resource mapping manner, the size of the minimum resource unit of the ePDCCH, and define, under the defined resource mapping manner, the number of the minimum resource units (eCCEs or eREGs) of the ePDCCH for each configuration of the number of PDCCH symbols, the number of CRS ports, the number of DMRS ports and the CSI-RS configuration. In other words, the present disclosure may define in the standards the resource mapping manner and the size of the minimum resource unit of the ePDCCH, and may define under the defined resource mapping manner, the number of the minimum resource units (eCCEs or eREGs) of the ePDCCH for each number of REs available for transmitting the ePDCCH (the number of REs is determined by the number of PDCCH symbols, number of CRS ports, number of DMRS ports and the CSI-RS configuration). For example, the number of REs available for transmitting the E-PDCCH in one PRB pair is N, the number of eCCEs is M. If a<N≤b, M=2; if b<N≤c, M=3; if c<N≤d, M=4, wherein a=60, b=90, c=120 and d=150. The values may be defined in the standards. Thus, UE is not required to be additionally notified about the values. The values may also be notified to eNB or UE by system via signaling.

EXAMPLE 3

Example 3 describes a method for determining the number of ePDCCH resource units if a resource block obtained by average division is taken as the minimum resource unit of the ePDCCH.

Besides 24 REs occupied by the DMRS, there are 144 REs in one PRB pair. The 144 REs in the PRB pair may be averagely divided into 8, 12, 16, 24 or 36 resource blocks. In the present disclosure, such a resource block is taken as the minimum resource block for the ePDCCH to allocate resources for the ePDCCH.

Figure 5A:
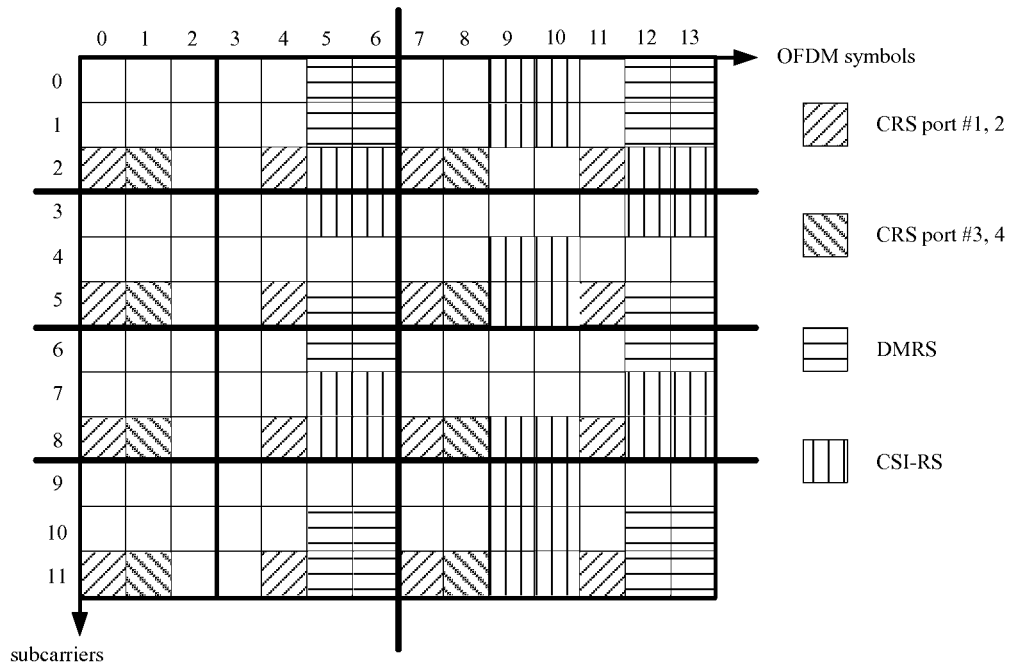
FIGS. 5a, 5b and 5c respectively show division of resource blocks in a PRB pair according to an example of the present disclosure.
Figure 5B:
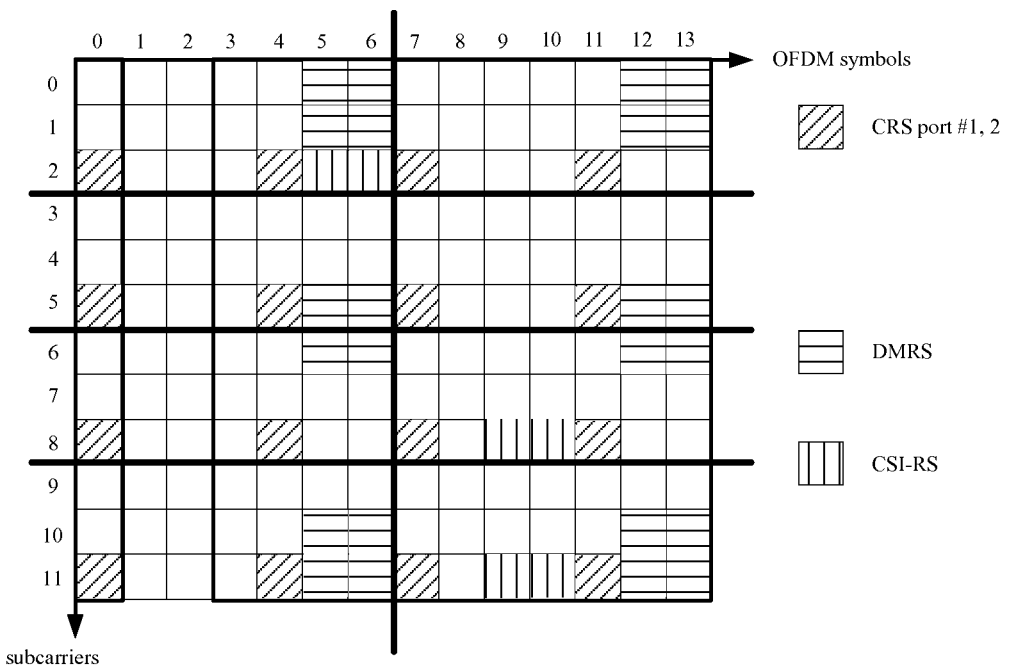

In a situation as shown in FIG. 5a, first three symbols are occupied by the PDCCH. There are 4 CRS ports (as shown by rectangles filled with slanted lines). The REs occupied by the DMRS are represented by the rectangles filled with horizontal lines. The REs occupied by the CSI-RS are represented by the rectangles filled with vertical lines. In a situation as shown in FIG. 5b, the first symbol is occupied by the PDCCH. There are 2 CRS ports (as shown by rectangles filled with slanted lines). The REs occupied by the DMRS are represented by the rectangles filled with horizontal lines. The REs occupied by the CSI-RS are represented by the rectangles filled with vertical lines. One PRB pair as shown in FIGS. 5a and 5b is divided into 8 resource blocks.

Although FIGS. 5a and 5b divide one PRB pair into the same number of resource blocks, the REs which are actually available for transmitting the ePDCCH are shown by the white rectangles, the sizes (i.e., numbers) of these REs are different in the two Figures.

In example 3, a requirement on the size of the resource block (i.e., the number of REs in one resource block) for transmitting the ePDCCH may be defined in advance. Thus, after the number of REs available for transmitting the ePDCCH in the PDSCH area of the subframe is determined according to the number of symbols occupied by the PDCCH, the number of CRS ports, the number of DMRS ports and the CSI-RS configuration, the division manner of the PRB pair, i.e., the number of resource blocks occupied by the ePDCCH in the subframe may be determined according to the size of the resource block for transmitting the ePDCCH defined in advance.

Figure 5C:
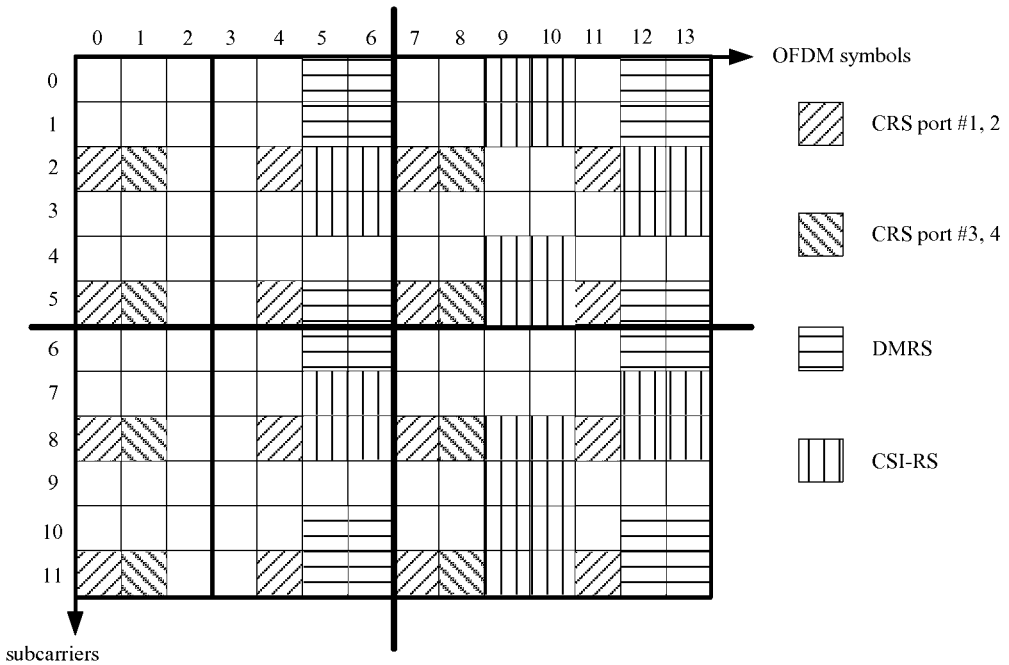

For example, it is defined that the resource block used for transmitting the ePDCCH includes approximately 12 REs, at least 10 REs. Thus, for the situation as shown in FIG. 5a, if the PRB pair is divided into 8 resource blocks, there may be some resource blocks which include less than 10 resource blocks, which does not meet the requirement. Thus, it is possible to divide the PRB pair into 4 resource blocks as shown in FIG. 5c. For the situation as shown in FIG. 5b, if the PRB pair is divided into 8 resource blocks, the number of REs included in each resource block meets the requirement. Therefore, the PRB pair may be divided into 8 resource blocks.

It should be noted that, the above just shows examples of the division of the resource blocks. Those skilled in the art would get variations according to the above principle to divide the resource block.

Figure 6:
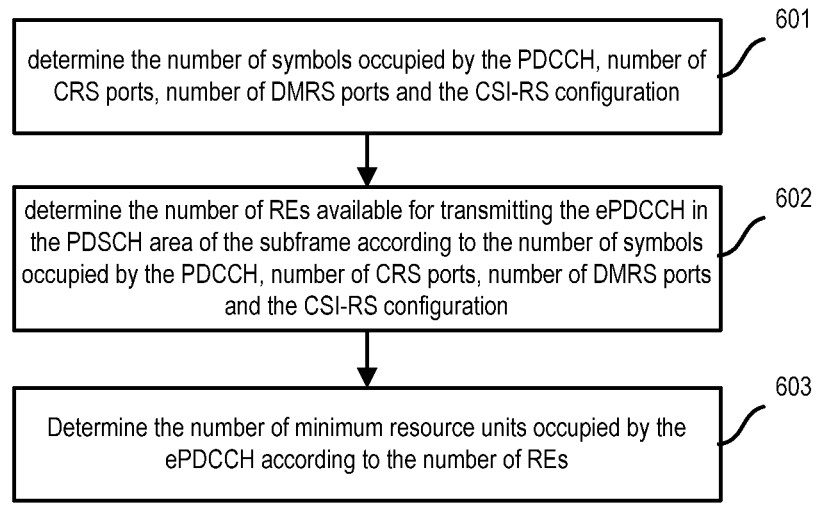
FIG. 6 shows an example of determining number of ePDCCH resource units according to the present disclosure.

In accordance with the above examples, FIG. 6 shows an example of an eNB allocating for UE resources for transmitting the ePDCCH according to the present disclosure.

As shown in FIG. 6, an evolution NodeB (eNB) side or a UE side needs to determine the number of symbols occupied by the PDCCH, number of CRS ports, number of DMRS ports and the CSI-RS configuration (block 601), and then determines the number of REs available for transmitting the ePDCCH in the PDSCH area of the subframe according to the above information (block 602). Thus, the number of minimum resource units of the ePDCCH may be determined according to the number of REs and the content defined by the standards as described above (block 603). For example, the number of eREGs available for transmitting the ePDCCH may be obtained through a rounding operation to a quotient of the number of REs and the size of the eREG.

When transmitting the ePDCCH, the eNB side may firstly determine the number of eCCEs/eREGs of the ePDCCH according to the above manner, and then transmits the ePDCCH according to a conventional manner.

When receiving and demodulating the ePDCCH, the UE side may determine the number of PDCCH symbols, the number of CRS ports, the numbers of non-zero power and zero-power CSI-RS and the number of DMRS ports according to a conventional manner. Then, after the number of RE resources occupied by the above channel and signals are subtracted, the UE side may determine the number of REs available for transmitting the ePDCCH. According to the definition of the standards, the UE side may determine the number of eCCEs/eREGs and then demodulate the ePDCCH according to a conventional manner.

In view of the above, since the number of resource units (eCCEs or eREGs or resource blocks) available for transmitting the ePDCCH in one PRB pair is relevant to the CSI-RS configuration and the number may vary a lot, the number of eCCEs or eREGs or resource blocks in the PRB pair should change along with the configuration. If the number of the eCCEs or eREGs or resource blocks is fixed, there may be waste of resources. The present disclosure avoids this problem.

In accordance with the above examples, an example of the present disclosure provides an apparatus for determining the number of ePDCCH resource units. The apparatus may be configured in a network device side, e.g., in an eNB. The apparatus may also be configured in UE.

Figure 7:
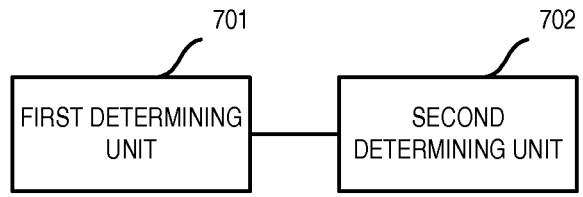
FIG. 7 shows an example of an apparatus for determining number of ePDCCH resource units according to the present disclosure.

As shown in FIG. 7 which shows an example of the apparatus for determining the number of ePDCCH resource units according to the present disclosure, the apparatus includes:
 a first determining unit 701, to determine number of symbols occupied by PDCCH, number of CRS ports, number of DMRS ports and a CSI-RS configuration in a subframe; and
 a second determining unit 702, to determine resources available for transmitting ePDCCH in a PDSCH area of the subframe according to the number of symbols occupied by the PDCCH, the number of CRS ports, the number of DMRS ports and the CSI-RS configuration.

The second determining unit 702 further determines the number of REs available for transmitting the ePDCCH in the PDSCH area of the subframe according to the number of symbols occupied by the PDCCH, the number of CRS ports, the number of DMRS ports and the CSI-RS configuration; and
 determines the number of resource units occupied by the ePDCCH in the subframe according to the number of REs.

For the number of REs available for transmitting the ePDCCH in the subframe under each configuration, system information includes the number of resource units occupied by the ePDCCH in the subframe. Accordingly, the second determining unit 702 may determine the number of the resource units occupied by the ePDCCH in the subframe corresponding to the number of the REs according to the system information and the number of the REs.

If the eCCE is the minimum resource block of the ePDCCH, the system information further includes the number of REs included in the eCCE with respect to each resource mapping manner. Accordingly, according to the number of REs available for transmitting the ePDCCH in the subframe under each configuration, it is possible to define the corresponding number of eCCEs (e.g., the larger the number of the REs available for transmitting the ePDCCH in the subframe, the larger the number of the eCCEs). The eCCEs in subframes under different configurations may include the same or different numbers of REs. The configuration includes the number of symbols occupied by the PDCCH, the number of CRS ports, the number of DMRS ports and the CSI-RS configuration. For different resource mapping manners, in one subframe, the number of REs in each eCCE may change or not.

The eREG may also be taken as the minimum resource unit of the ePDCCH. Under different configurations, the number of REs in the eREG does not change. The configuration includes the number of symbols occupied by the PDCCH, the number of CRS ports, the number of DMRS ports and the CSI-RS configuration.

If the resource block obtained via average division is taken as the minimum resource unit of the ePDCCH, the system information further includes the requirement on the number of REs included in the resource block. The second determining unit 702 determines, according to the system information and the determined number of REs, the resource division manner of the physical resource blocks (PRBs) in the subframe corresponding to the number of REs. The number of REs in each resource block obtained according to the determined resource division manner meets the requirement on the number of REs in the resource block defined by the system information.

Those skilled in the art would know that the units in the apparatus of the present disclosure may be configured in the apparatus according to the description of the example, or be configured in one or more apparatuses after some modifications. The units may be combined into one unit or divided into multiple sub-units.

In view of the above description, it is clear for those skilled in the art that the present disclosure may be implemented by software and necessary universal hardware platform, or implemented by hardware. In some cases, the former implementation manner is better. Based on this, the technical solution of the present disclosure or the contribution part of the present disclosure may be implemented as software product. The software product is stored in a storage medium, including a set of instructions to enable a computer device (e.g., a personal computer, a server, or a network device, etc.) to execute the method provided by the examples of the present disclosure.

What has been described and illustrated herein is a preferred example of the disclosure along with some of its variations. It should be noted that, for those skilled in the art many variations are possible within the scope of the disclosure, which are also within the protection scope of the present disclosure.

The invention claimed is:

1. A method for determining enhanced physical downlink control channel (ePDCCH) resources, comprising:
 determining number of symbols occupied by a physical downlink control channel (PDCCH), number of common reference signal (CRS) ports, number of demodulation reference signal (DMRS) ports and channel state information-reference signal (CSI-RS) configuration in a subframe; and
 determining resources available for transmitting an ePDCCH in a physical downlink shared channel (PDSCH) area of the subframe according to the number of symbols occupied by the PDCCH, the number of CRS ports, the number of DMRS ports and the CSI-RS configuration.

2. The method of claim 1, wherein the determining resources available for transmitting the ePDCCH in a PDSCH area of the subframe according to the number of symbols occupied by the PDCCH, the number of CRS ports, the number of DMRS ports and the CSI-RS configuration comprises:
 determining number of resource elements (REs) available for transmitting the ePDCCH in the PDSCH area of the subframe according to the number of symbols occupied by the PDCCH, the number of CRS ports, the number of DMRS ports and the CSI-RS configuration; and
 determining number of resource units occupied by the ePDCCH in the subframe according to the number of REs.

3. The method of claim 2, wherein for the number of REs available for transmitting the ePDCCH in the subframe under each configuration, the number of resource units occupied by the ePDCCH in the subframe is defined in system information;
 determining the number of resource units occupied by the ePDCCH in the subframe according to the number of REs comprises:

determining the number of resource units occupied by the ePDCCH in the subframe corresponding to the number of REs according to the system information and the number of REs.

4. The method of claim 3, wherein an enhanced control channel element (eCCE) is the resource unit of the ePDCCH, the system information further comprises number of REs in the eCCE defined according to a resource mapping manner;

for the number of REs available for transmitting the ePDCCH in the subframe under each configuration, defining the number of resource units occupied by the ePDCCH in the subframe comprises:

according to the number of REs available for transmitting the ePDCCH in the subframe under each configuration, defining corresponding number of eCCEs; for subframes with different configurations, the eCCE comprises the same or different number of REs, wherein the configuration comprises the number of symbols occupied by the ePDCCH, the number of CRS ports, the number of DMRS ports and the CSI-RS configuration;

wherein in the subframe, the eCCE comprises the same or different number of REs according to the resource mapping manner.

5. The method of claim 3, wherein an enhanced resource element group (eREG) is the resource unit of the ePDCCH;

for the number of REs available for transmitting the ePDCCH in the subframe under each configuration, determining the number of resource units occupied by the ePDCCH in the subframe comprises: for subframes under different configurations, the eREG comprises the same number of REs, wherein the configuration comprises the number of symbols occupied by the ePDCCH, the number of CRS ports, the number of DMRS ports and the CSI-RS configuration.

6. The method of claim 5, wherein for the number of REs available for transmitting the ePDCCH in the subframe under each configuration in the system information, the number of eREGs is determined according to the resource mapping manner; for the same number of REs, the same or different number of eREGs is obtained according to different resource mapping manners.

7. The method of claim 3, wherein a resource block obtained via average division is the resource unit of the ePDCCH, the system information further comprises a requirement on the number of REs comprised in the resource block;

determining the number of resource units occupied by the ePDCCH in the subframe corresponding to the number of REs according to the system information and the number of REs comprises: determining a resource division manner of physical resource blocks (PRBs) in the subframe corresponding to the number of REs according to the system information and the number of REs, wherein the number of REs comprised in each resource block obtained according to the determined resource division manner meets the requirement on the number of REs comprised in the resource block defined in the system information.

8. An apparatus for determining enhanced physical downlink control channel (ePDCCH) resources, comprising:

a first determining unit, to determine number of symbols occupied by a physical downlink control channel (PDCCH), number of common reference signal (CRS) ports, number of demodulation reference signal (DMRS) ports and a channel state information-reference signal (CSI-RS) configuration in a subframe; and a second determining unit, to determine resources available for transmitting an ePDCCH in a physical downlink shared channel (PDSCH) area of the subframe according to the number of symbols occupied by the PDCCH, the number of CRS ports, the number of DMRS ports and the CSI-RS configuration.

9. The apparatus of claim 8, further comprising wherein the second determining unit is further to determine number of resource elements (REs) available for transmitting the ePDCCH in the PDSCH area of the subframe according to the number of symbols occupied by the PDCCH, the number of CRS ports, the number of DMRS ports and the CSI-RS configuration; and determine the number of resource units occupied by the ePDCCH in the subframe according to the number of REs.

10. The apparatus of claim 9, wherein for the number of REs available for transmitting the ePDCCH in the subframe under each configuration, the number of resource units occupied by the ePDCCH in the subframe is defined in system information; the second determining unit is further to determine the number of resource units occupied by the ePDCCH in the subframe corresponding to the number of the REs according to the system information.

11. The apparatus of claim 10, wherein an enhanced control channel element (eCCE) is the resource unit of the ePDCCH, the system information further comprises the number of REs comprised in the eCCE with respect to each resource mapping manner;

for the number of REs available for transmitting the ePDCCH in the subframe under each configuration, the number of eCCEs is defined; for subframes under different configurations, the eCCE comprises the same or different number of REs; wherein the configuration comprises the number of symbols occupied by the PDCCH, the number of CRS ports, the number of DMRS ports and the CSI-RS configuration; with respect to different resource mapping manners, the eCCE comprises the same or different number of REs in one subframe.

12. The apparatus of claim 10, wherein an enhanced resource element group (eREG) is the resource unit of the ePDCCH;

for subframes under different configurations, the eREG comprises the same number of REs, wherein the configuration comprises the number of symbols occupied by the ePDCCH, the number of CRS ports, the number of DMRS ports and the CSI-RS configuration.

13. The apparatus of claim 12, wherein for the number of REs available for transmitting the ePDCCH in the subframe under each configuration comprised in the system information, the number of eREGs is determined according to a resource mapping manner; for the same number of REs, the same or different number of eREGs is obtained according to different resource mapping manners.

14. The apparatus of claim 10, wherein a resource block obtained via average division is the resource unit of the ePDCCH, the system information further comprises a requirement on the number of REs comprised in the resource block;

the second determining unit is further to determine a resource division manner of physical resource blocks (PRBs) in the subframe corresponding to the number of REs according to the system information and the number of REs, wherein the number of REs comprised in each resource block obtained according to the determined resource mapping manner meets the requirement on the number of REs comprised in the resource block defined in the system information.

* * * * *